United States Patent
Graves et al.

(10) Patent No.: US 8,971,321 B2
(45) Date of Patent: Mar. 3, 2015

(54) SYSTEM AND METHOD FOR ACCELERATING AND DECELERATING PACKETS

(71) Applicant: FutureWei Technologies, Inc., Plano, TX (US)

(72) Inventors: Alan Frank Graves, Kanata (CA); Peter Ashwood-Smith, Gatineau (CA); Dominic Goodwill, Ottawa (CA); Eric Bernier, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 131 days.

(21) Appl. No.: 13/901,944

(22) Filed: May 24, 2013

(65) Prior Publication Data

US 2014/0161450 A1  Jun. 12, 2014

Related U.S. Application Data

(60) Provisional application No. 61/735,842, filed on Dec. 11, 2012.

(51) Int. Cl.
*H04L 12/28* (2006.01)
*H04Q 11/00* (2006.01)
*H04W 76/04* (2009.01)

(52) U.S. Cl.
CPC ........... *H04Q 11/0005* (2013.01); *H04W 76/04* (2013.01)
USPC ........... 370/389; 370/392; 370/503; 375/354; 398/54; 398/51

(58) Field of Classification Search
USPC ....................... 375/354; 398/54, 51
See application file for complete search history.

(56) References Cited

U.S. PATENT DOCUMENTS

| | | | |
|---|---|---|---|
| 7,968,248 B2 | 6/2011 | Liu et al. | |
| 2002/0105977 A1* | 8/2002 | Masunaga et al. | 370/519 |
| 2005/0163116 A1* | 7/2005 | Anderson et al. | 370/389 |

* cited by examiner

*Primary Examiner* — Duc C Ho
(74) *Attorney, Agent, or Firm* — Slater & Matsil, L.L.P.

(57) ABSTRACT

In one embodiment, a system for accelerating a packet stream includes a first accelerator configured to re-clock the packet stream from a first clock rate to a second clock rate to produce an accelerated packet stream, where the first clock rate is less than the second clock rate, where the packet stream has a first inter-packet gap, where the accelerated packet stream has a second inter-packet gap, and where the second inter-packet gap is greater than the first inter-packet gap. The system also includes a switch coupled to the first accelerator, where the switch is configured to switch the accelerated packet stream at the second clock rate to produce a switched packet stream.

21 Claims, 13 Drawing Sheets

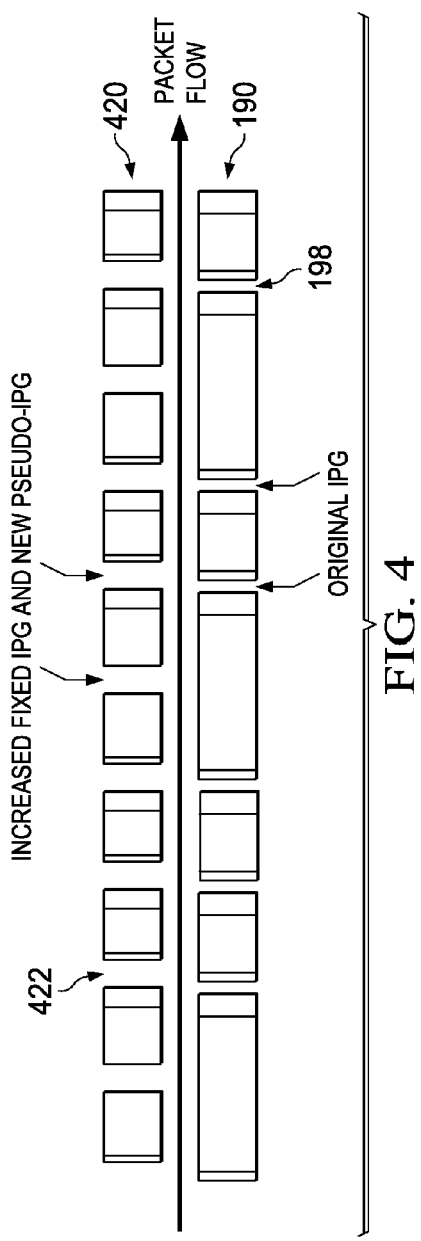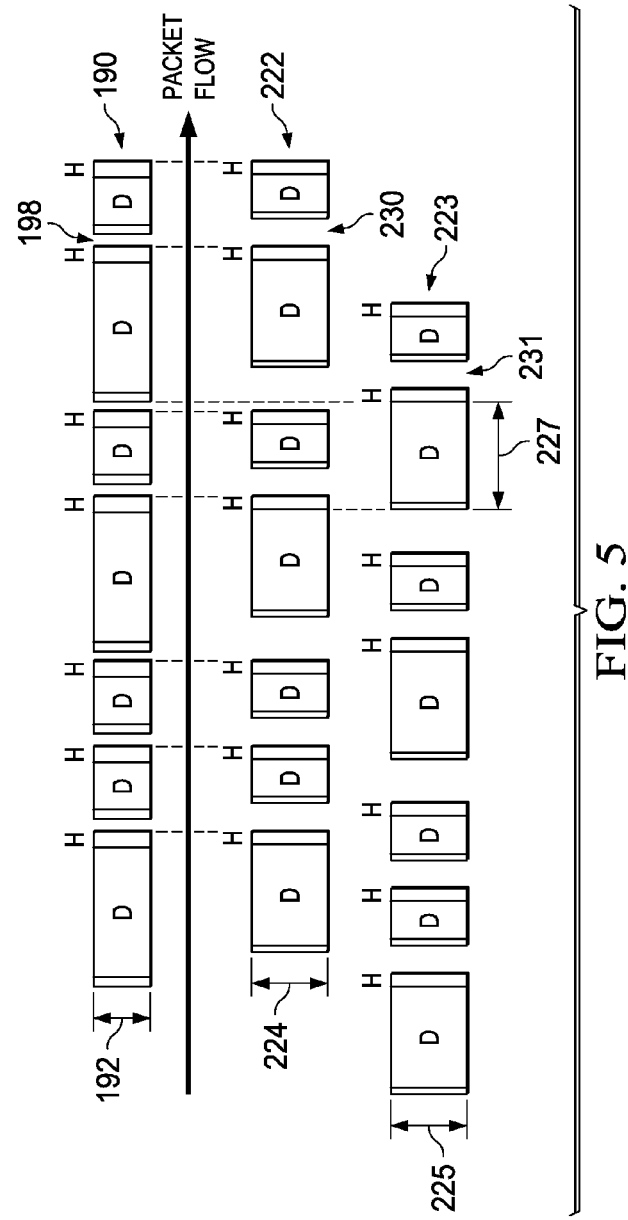

SYSTEM AND METHOD FOR ACCELERATING AND DECELERATING PACKETS

This application claims the benefit of U.S. Provisional Application Ser. No. 61/735,842 filed on Dec. 11, 2012, and entitled "System and Method for Multi-Wavelength Signaling in a Photonic Packet Switch," which application is hereby incorporated herein by reference.

TECHNICAL FIELD

The present invention relates to a system and method for communications, and, in particular, to a system and method for accelerating and decelerating packets.

BACKGROUND

Data centers route massive quantities of data. Currently, data centers may have a throughput of 5-7 terabytes per second, which is expected to drastically increase in the future. Data centers consist of huge numbers of racks of servers, racks of storage devices, and other racks, all of which are interconnected via a massive centralized packet switching resource. In this resource, electrical packet switches are used to route data packets in these data centers. Electrical packet switches switch or route packets based on a packet header with inter-stage buffering, which can overflow, causing packet loss and the need for packet retransmission.

The racks of servers, storage devices, and input-output devices contain top of rack (TOR) packet switches which combine packet streams from their associated servers and/or other peripherals into a lesser number of very high speed streams per TOR switch. The TOR switch outputs a packet stream to the packet switching fabric. Also, the TOR switches receive the returning switched streams from the packet switching core and distribute them to servers within their rack. There may be 4×40 Gb/s streams from each TOR switch to the packet switching core, and the same number of return streams. Additionally, there may be one TOR switch per rack, hundreds to ten thousands of racks, and hence hundreds to ten thousands of TOR switches in a data center.

Photonic packet switches include a family of network communication elements that can be used as the core switch in a data center, or used in any other packet switching environment. In a photonic packet switch, packets are switched by photonic devices, without converting them to electrical signals. Photonic switches tend to have challenges in speed of setting up and taking down connections but exhibit huge bandwidth throughputs when a connection is in place.

SUMMARY

An embodiment system for accelerating a packet stream includes a first accelerator configured to re-clock the packet stream from a first clock rate to a second clock rate to produce an accelerated packet stream, where the first clock rate is less than the second clock rate, where the packet stream has a first inter-packet gap, where the accelerated packet stream has a second inter-packet gap, and where the second inter-packet gap is greater than the first inter-packet gap. The system also includes a switch coupled to the first accelerator, where the switch is configured to switch the accelerated packet stream at the second clock rate to produce a switched packet stream.

An embodiment system for decelerating a packet stream includes a switch configured to switch the packet stream at a first clock rate. The system also includes a decelerator coupled to the switch, where the decelerator is configured to re-clock the switched packet stream from the first clock rate to a second clock rate to produce a decelerated packet stream, where the second clock rate is lower than the first clock rate, where the switched packet stream has a first inter-packet gap, where the decelerated packet stream has a second inter-packet gap, and where the second inter-packet gap is smaller than the first inter-packet gap.

An embodiment method for accelerating a packet stream includes receiving the packet stream at a first clock rate, where the packet stream has a first inter-packet gap and storing the packet stream in a first buffer at the first clock rate. The method also includes generating a second clock having a second clock rate, where the second clock rate is higher than the first clock rate. Additionally, the method includes retrieving the stored packet stream at the second clock rate to produce an accelerated packet stream, where the accelerated packet stream has a second inter-packet gap, and where the second inter-packet gap is greater than the first inter-packet gap. Also, the method includes optically switching the accelerated packet stream.

An embodiment method for decelerating a packet stream includes optically switching the packet stream and storing the packet stream in a first buffer at a first clock rate, where the packet stream has a first inter-packet gap. Also, the method includes generating a second clock having a second clock rate, where the second clock rate is lower than the first clock rate and retrieving the stored packet stream at the second clock rate to produce a decelerated packet stream, where the decelerated packet stream has a second inter-packet gap, and where the second inter-packet gap is less than the first inter-packet gap.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 4 illustrates an accelerated packet stream;

FIG. 5 illustrates accelerated packet stream and a delayed and accelerated packet stream;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1A:
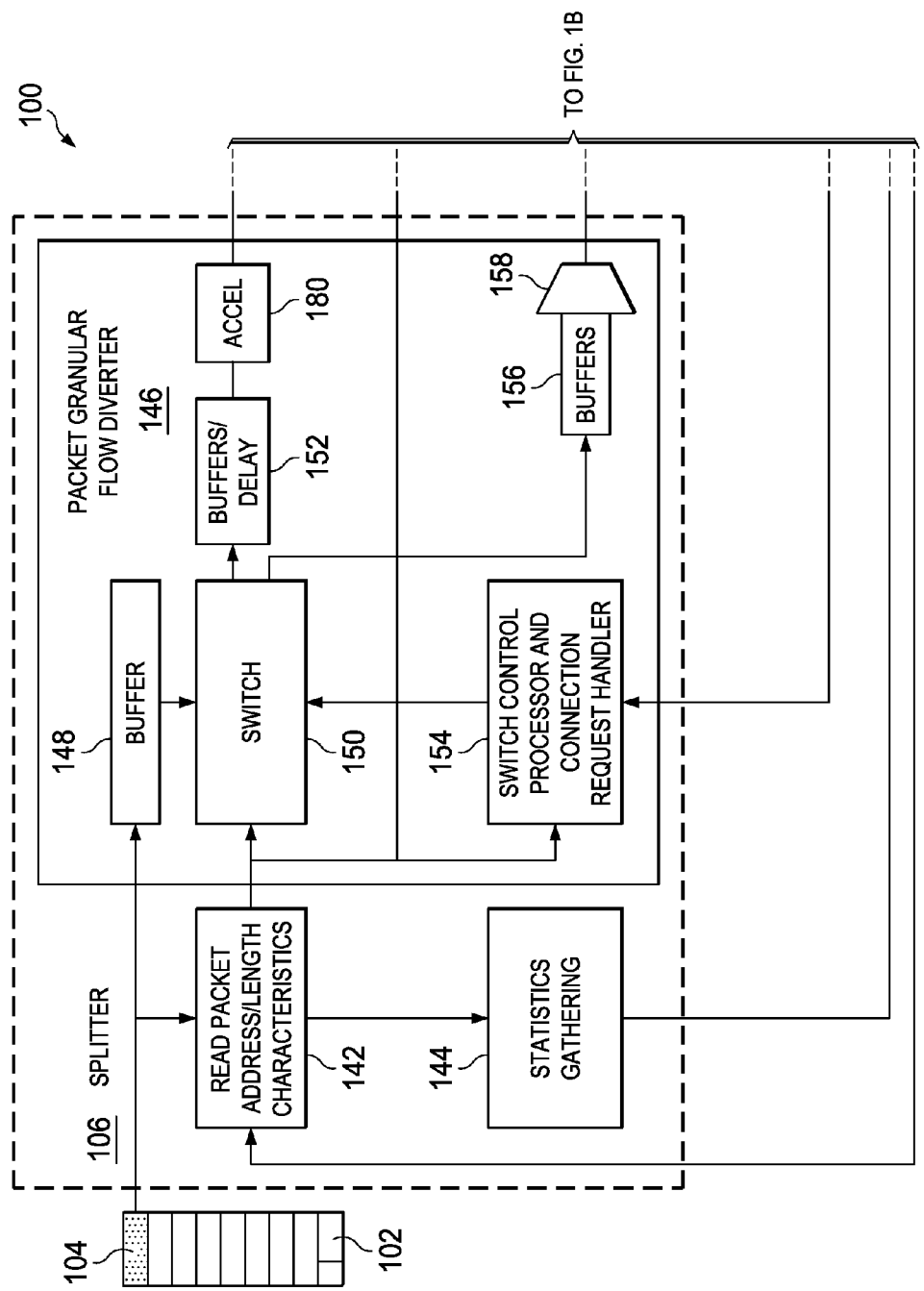
FIGS. 1 A-B illustrate an embodiment system for steering packet streams.
Figure 1B:
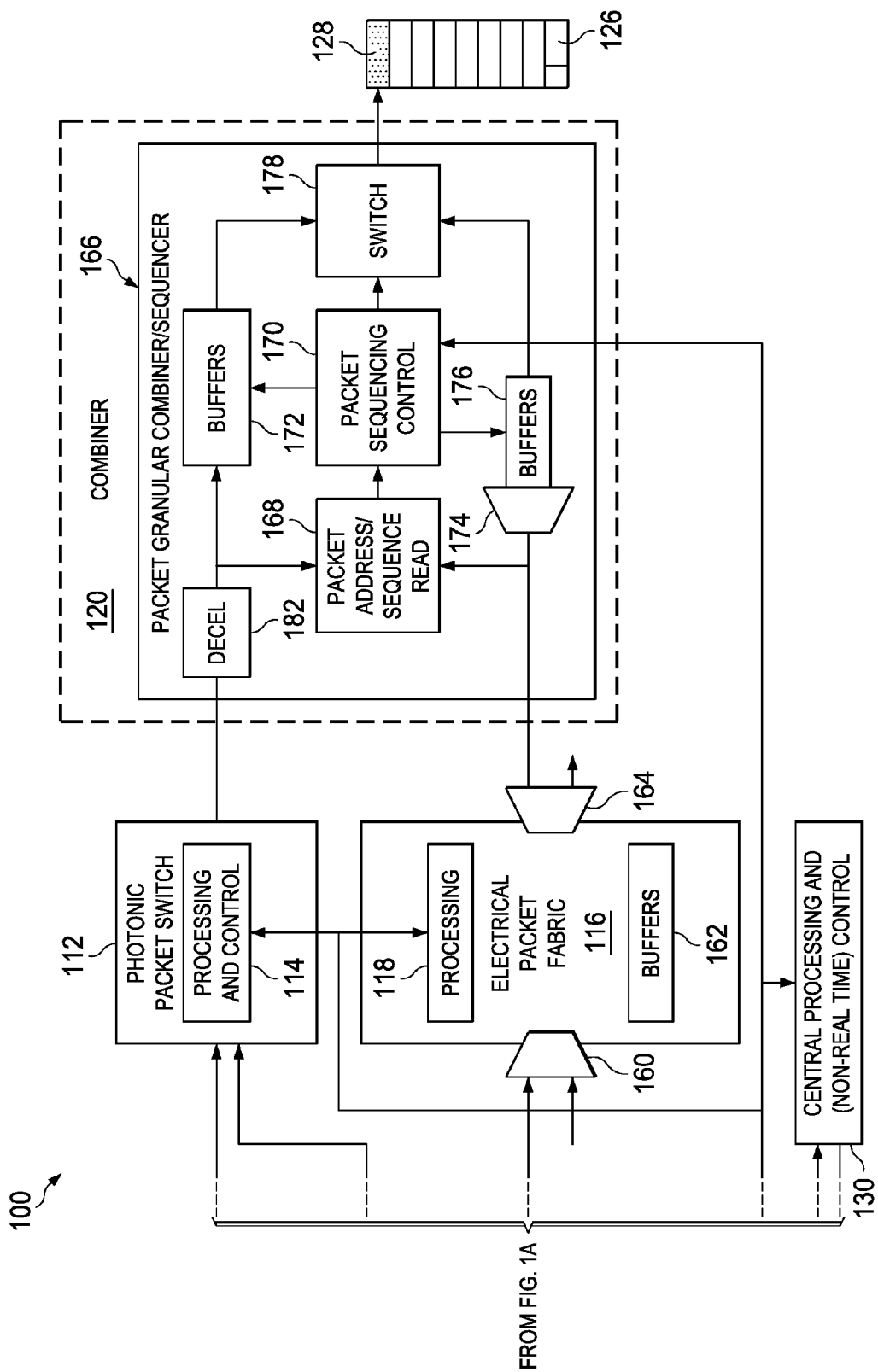

FIG. 1 illustrates system 140 for routing packet streams, e.g., in a data center. Systems for routing packet streams are further discussed in U.S. Provisional Application Ser. No. 61/787,847 filed on Mar. 15, 2013, and entitled "System and Method for Steering Packet Streams," which this application incorporates hereby by reference. Initially, the packet stream from top of rack (TOR) switch 104 in rack 102 is fed to a buffer 148 in packet granular flow diverter 146 while read packet address and length characteristics module 142 determines the packet address and the length of the packet. The packet address and length are fed to statistics gathering module 144, which gathers statistics to send to control unit 130. Control unit 130 gathers statistics on the mix of packet lengths for non-real time uses. Switch control processor and connection request handler 154 handles the real time packet-by-packet processes within packet granular flow diverter 146, which diverts individual packets into one path or another based on a measured or detected packet attribute such as the packet length.

Buffer 148 stores the packet while the packet address and length are read. Also, the packet address and length characteristic are fed to read packet address and length characteristics module 142 and to switch control processor and connection request handler 154. The output of switch control processor and connection request handler 154 is fed to switch 150. The packet is conveyed to switch 150, which is set by the output from the switch control processor and connection request handler 154, so the packet will be routed to photonic switching fabric 112 or to electrical packet switching fabric 116. For example, the routing is based on the determination by switch control processor and connection request handler 154 as to whether the length of the packet exceeds or does not exceed a set packet length or other threshold. Switch 150 routes the packet to photonic switching fabric 112 or to electrical packet switching fabric 116, for example based on the length of the packet. Switch 150 may be a simple switch. If the packet is routed to photonic switching fabric 112, it is passed to buffer and delay 152, accelerator 180, and then to photonic switching fabric 112. Buffer and delay 152 stores the packet until the appropriate destination port of photonic switching fabric 112 becomes available, because of the lack of photonic buffering or storage. Accelerator 180 accelerates the clock rate of the packet stream routed to photonic packet switch 180 to increase the inter-packet gap (IPG).

On the other hand, if the packet is routed to electrical packet switching fabric 116, it is passed to buffer 156, statistical multiplexer 158, and statistical demultiplexer 160, then to electrical packet switching fabric 116. Buffer 156 stores the packets until they can be sent to the electrical packet switch. Packets from multiple packet streams may be statistically multiplexed by statistical multiplexer 158, so the ports of electrical packet switching fabric 116 may be more fully utilized. Then, statistical demultiplexer 160 performs statistical demultiplexing for low occupancy data streams into a series of parallel data buffers.

Photonic switching fabric 112 is a multistage solid state photonic switching fabric created from a series of nested solid state photonic switches. Electrical packet switching fabric 116 is an electrical packet fabric. Electrical packet switching fabric 116 may receive packets using statistical demultiplexer 160 and statistically multiplex already switched packets using statistical multiplexer 164. The packets are then demultiplexed by statistical demultiplexer 174 in combiner 120. Electrical packet switching fabric 116 may include processing functions responsive to the packet routing information in any conventional manner for an electrical packet switch and buffer 162, which may include arrays of buffers.

The switched packets from photonic switching fabric 112 and electrical packet switching fabric 116 are fed to combiner 120, which combines the two switched packet streams. Combiner 120 contains packet granular combiner and sequencer 166. The photonic packet stream is fed to decelerator 182, where the clock speed of the packet is decelerated, which reduces the inter-packet gap. In an example, the decelerated packet has the same clock rate and inter-packet gap as the packet before acceleration. Then, the photonic packet stream is fed to buffer 172 to be stored, while the address and sequence is read by packet address and sequence reader 168, which determines the destination address and sequence number of the photonic packet. The electrical packet stream is also fed to statistical demultiplexer 174 to be statistically demultiplexed and to buffer 176 to be stored, while its characteristics are determined by the packet address and sequence reader 168. Then, packet address and sequence reader 168 determines the sequence to read packets from buffer 172 and buffer 176 based on interleaving packets from both paths to restore a sequential sequence numbering of the packets, so the packets of the two streams are read out in the correct sequence. Next, the packet sequencing control unit 170 releases the packets in each flow in their original sequence. As the packets are released by packet sequence control unit 170, they are combined using switch 178, e.g. a simple switch. In an example, splitter 106 and combiner 120 are implemented in a single module. Alternatively, splitter 106 and combiner 120 may be implemented separately. Splitter 106 may be integrated in TOR switch 104, and combiner 120 may be implemented in TOR switch 128. TOR switch 104 may be in rack 102, and TOR switch 128 may be in rack 126.

Photonic packet switches may be used as the core switch in a data center, as illustrated in FIG. 1. In a photonic packet switch, packets are switched by photonic devices, without converting them to electrical signals. Photonic packet switches switch streams of packets by switching each packet independently towards its destination. Thus, the photonic switching fabric is set up for a new destination during the inter-packet gap (IPG) or dead-band. For a given level of transport efficiency, the inter-packet gap is inversely proportional to the bit rate. For high speed switches the inter-packet gap can be very short, giving rise to difficulties in addressing and setting up the photonic switch.

Figure 2:
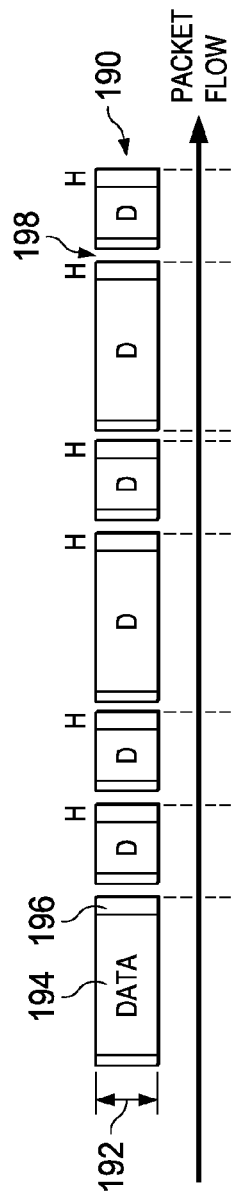
FIG. 2 illustrates a packet stream.

FIG. 2 illustrates packet stream 190 with a bit-rate 192, which is represented by the height. Packet stream 190 contains data 194, header 196, and inter-packet gap 198. Inter-packet gap 198 may be about 100 clock cycles of bit rate 192. For example, for a clock speed R and a packet length N, the packet length is equal to N/R, and inter-packet gap 198 is equal to 100/R. For example, when bandwidth 192 is 10 Gb/s inter-packet gap 198 is 10 ns, when bandwidth 192 is 40 Gb/s inter-packet gap 198 is 2.5 ns, and when bandwidth 192 is 100 Gb/s inter-packet gap 198 is 1 ns. In a photonic switch, the physical connection of the optical light power is changed entirely between packets during the inter-packet gap, so that the tail end of one packet fully transits the switch before the connection reconfiguration commences. The switch reconfiguration is completed before the start of the leading edge of the next packet, since storing the packet while the reconfiguration is taking place is problematic. The accurately timed delivery of the connection change command to the photonic crosspoint and the complete operation of the crosspoint should be performed during the inter-packet gap. If the physical connection is not initiated and completed during the inter-packet gap, the tail end of the previous packet or the leading edge of the next packet will be cut off. A larger inter-packet gap gives the photonic switch more time to set up and change connections between packets.

Figure 3:
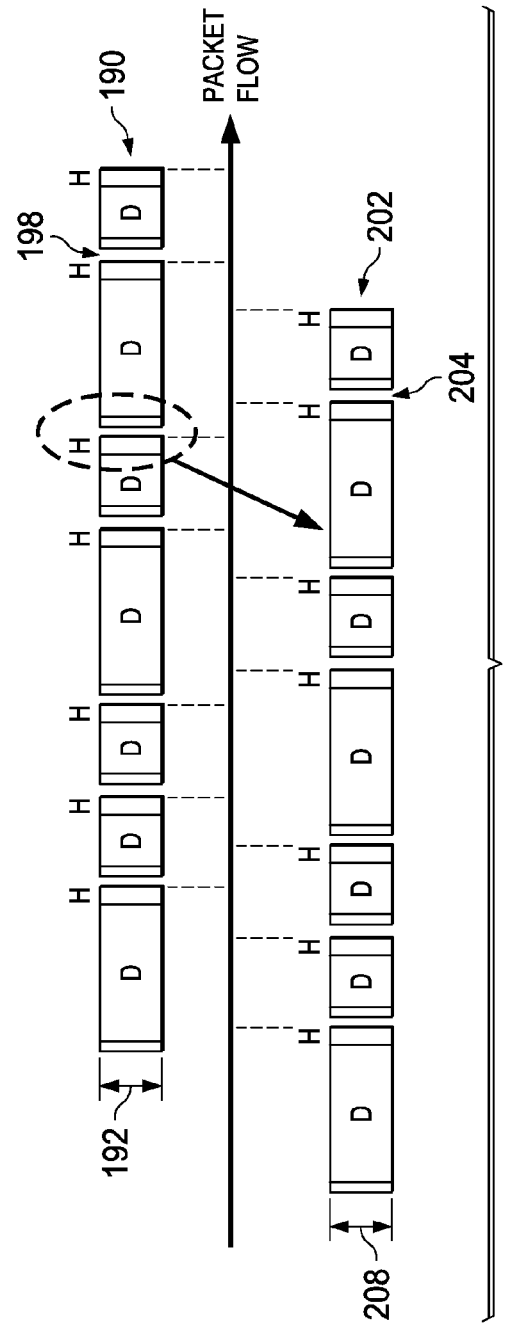
FIG. 3 illustrates a delayed packet stream.

Optical delay lines can delay the packet stream, for example while routing decisions are made. FIG. 3 illustrates packet stream 190, with inter-packet gap 198 and bandwidth 192 and delayed packet stream 202, with inter-packet gap 210 and bandwidth 208. Inter-packet gap 198 is equal to inter-packet gap 210, and bandwidth 192 is equal to bandwidth 208. The inter-packet gap is not increased, because the optical delay line delays all of the signal by the same amount, thus the same delay is applied to all parts of the packet, including the data and the inter-packet gap. At the input of the photonic packet switch, some light is tapped, and header 196 is detected.

A packet stream may be accelerated, where the duration of the packet is decreased, and the inter-packet gap is increased. FIG. 4 illustrates packet acceleration, where packet stream 190 with inter-packet gap 198 is accelerated to packet stream 420 with inter-packet gap 422. Packet stream 190 is read into a buffer at an input clock rate, and is read out from the buffer at the output clock rate, which is higher than the input clock rate. In this example, the buffer used has a length equal to the length of the shortest packet. The shortest packet is entirely read into the buffer at the lower clock rate and read out from the buffer at the higher clock rate. For a long packet, when the buffer is full, the leading edge of the packet is read out at the higher clock rate while the trailing edge is written into the buffer at a lower clock rate. The clock is gapped until the buffer approaches full, or a preset time, and this sequence is repeated. Packet stream 420 has uniform chunk sizes of the size of the buffer and a uniform inter-packet gap. There is a short time delay in the buffer with a uniform improvement in the inter-packet gap.

FIG. 5 illustrates packet acceleration of packet stream 190 with inter-packet gap 198 and bandwidth 192 to accelerated packet stream 222 with inter-packet gap 230 and bandwidth 224. Packet stream 190 is read in to a buffer at an initial clock rate, and read out from the buffer at a higher clock rate. The leading edges of the original and accelerated packets are shown as synchronized. However, in practice the leading edges of all packets may have a fixed time offset or delay from the leading edges of the un-accelerated packets. Inter-packet gap 230 is larger than inter-packet gap 198, and bandwidth 224 is larger than bandwidth 192.

Also, packet stream 223 is an accelerated and delayed packet stream. Packet stream 223 has inter-packet gap 231, which is equal to inter-packet gap 230. Additionally, packet stream 223 has bandwidth 225, which is the same as bandwidth 224. Packet stream 223 has a delay 227 compared to packet stream 222.

The original packet length, in time, excluding the inter-packet gap, is N/R. The length of the new packet is equal to the old packet length in time divided by the scaling of the clock speed, C, which equals B/A. This can be expressed as:

$$\frac{N}{CR},$$

where C is the scaling of the clock speed, a ratio number, R is the clock speed (e.g. in GHz), and N is the packet length. The packet length may be clock cycles, which is in bits for a serial stream. Hence, for an original packet length of 1500 bytes (12,000 bits) and a serial stream at an original clock speed of 40 GHz, the original packet length would be N/R=12,000/40=300 ns. If C=1.25, resulting in an accelerated clock rate of 50 GHz, the new accelerated packet duration would be 12000/(1.25*40)=240 ns. Thus, if the original inter-packet gap 198 is 100/R (e.g., at 40 GHz inter-packet gap 198=2.5 ns) then inter-packet gap 230 of the accelerated stream is equal to:

$$\frac{N(C-1)+100C}{CR}.$$

For the example values used above, this translates to (12000 (1.25−1)+100*1.25)/1.25*40=62.5 ns. Hence the increase in the inter-packet gap is 62.5−2.5=60 ns. The change in inter-packet gap, expressed in ratio terms relative to the original inter-packet gap, is equal to:

$$\frac{N(C-1)}{100C}+1.$$

Note that this ratio, unlike the actual change in inter-packet gap length, is independent of clock speed. Packet stream 222 is well suited for a photonic switch, because photonic switches perform better with a large inter-packet gap, but are generally not limited by a high total bandwidth.

The burst speed may be increased by adding forward error correction (FEC) to each packet or packet chunk. Breaking the packets into constant size chunks, as illustrated in FIG. 4, may be useful for FEC, because it enables a consistent FEC algorithm to be used. When each chunk contains its own FEC, there is no FEC across the entire packet, except for small packets that use a single chunk. Also, the destination switch may decode the first part of the packet, which may contain address information, and begin to make routing decisions before the rest of the packet has arrived.

The inter-packet gap affects the required photonic fabric speed. With a 40 Gb/s packet stream, the inter-packet gap is about 2.5 ns. However, for a 10 Gb/s packet stream, the inter-packet gap is about 10 ns, while the inter-packet gap for a 100 Gb/s packet stream is about 1 ns. Utilizing a fabric with a known switching speed capability, (or example 7 ns, the photonic fabric would be usable with un-accelerated packet streams of 10 Gb/s. However, the photonic fabric would not be usable with un-accelerated b=packet streams of 40 or 100 Gb/s, because, while its connected paths can support a 40 or 100 Gb/s bandwidth, the act of setting up the connections is too slow. If a 40 or 100 Gb/s packet stream is accelerated to allow inter-packet gaps of 7 ns, then that photonic switch would be usable to switch accelerated 40 or 100 Gb/s packets, since its connection bandwidth far exceeds these values.

Table 1, illustrated below, depicts the increase in inter-packet gap based on the number of bytes in the packet and the clock speed ratio. Italicized values, which illustrate more than 1500 bytes, are for jumbo packets. The maximum size for standard data packets is 1500 bytes. However, some data centers use larger jumbo packets, which may by 9000 bytes or longer. For increasing clock speed ratios and for increasing packet lengths, the increase in inter-packet gap is more pronounced. For example, for a packet with a maximum length of 1500 bytes, a clock speed increase of 1.1 will increase the inter-packet gap by almost a factor of 12, while a short 50 byte packet with a clock speed increase of 1.1 only has a gain of a factor of 1.4. For a medium length packet of 500 bytes, the inter-packet gap increase for a 1.1 clock speed increase is gain of a factor of 4.6. A clock speed increase of 2:1 for a 500 byte packet increases the inter-packet gap by a factor of 21, while a moderate clock speed increase of 1.1:1 increases the inter-packet gap of a 1,500 byte (12,000 bit) packet stream by 11.9:1. In the context of a photonic "long packet" switch operating at 40 Gb/s or 100 Gb/s per port, this would correspond to increasing the set up time between packets from 2.5 and 1 ns respectively to 29.75 and 11.9 ns respectively, providing positive margin, for an example a 7 ns set up time switch. By adjustment of the overclocking ratio (C), the capabilities of a photonic switch with a reasonable set up time can be better exploited. For instance, if the set up time of the photonic switch was instead increased to 15 ns, then the 40 Gb/s approach would be unchanged, but the overclocking rate for the 100 Gb/s solution would have to be increased to 1.2:1, yielding an inter-packet gap of 21 ns, which restores a positive operating margin.

TABLE 1

| N (bits) | N' (bytes) | C (Clock speed ratio) | Resultant IPG Ratio |
|---|---|---|---|
| 400 | 50 | 1 | 1.000 |
| 800 | 100 | 1 | 1.000 |
| 2,000 | 250 | 1 | 1.000 |
| 4,000 | 500 | 1 | 1.000 |
| 8,000 | 1,000 | 1 | 1.000 |
| 12,000 | 1,500 | 1 | 1.000 |
| 48,000 | 6,000 | 1 | 1.000 |
| 72,000 | 9,000 | 1 | 1.000 |
| 400 | 50 | 1.1 | 1.364 |
| 800 | 100 | 1.1 | 1.727 |
| 2,000 | 250 | 1.1 | 2.818 |
| 4,000 | 500 | 1.1 | 4.636 |
| 8,000 | 1,000 | 1.1 | 8.273 |
| 12,000 | 1,500 | 1.1 | 11.909 |
| 48,000 | 6,000 | 1.1 | 44.636 |
| 72,000 | 9,000 | 1.1 | 66.455 |
| 400 | 50 | 1.2 | 1.667 |
| 800 | 100 | 1.2 | 2.333 |
| 2,000 | 250 | 1.2 | 4.333 |
| 4,000 | 500 | 1.2 | 7.667 |
| 8,000 | 1,000 | 1.2 | 14.333 |
| 12,000 | 1,500 | 1.2 | 21.000 |
| 48,000 | 6,000 | 1.2 | 81.000 |
| 72,000 | 9,000 | 1.2 | 121.000 |
| 400 | 50 | 1.35 | 2.037 |
| 800 | 100 | 1.35 | 3.074 |
| 2,000 | 250 | 1.35 | 6.185 |
| 4,000 | 500 | 1.35 | 11.370 |
| 8,000 | 1,000 | 1.35 | 21.741 |
| 12,000 | 1,500 | 1.35 | 32.111 |
| 48,000 | 6,000 | 1.35 | 125.444 |
| 72,000 | 9,000 | 1.35 | 187.667 |
| 400 | 50 | 1.5 | 2.333 |
| 800 | 100 | 1.5 | 3.667 |
| 2,000 | 250 | 1.5 | 7.667 |
| 4,000 | 500 | 1.5 | 14.333 |
| 8,000 | 1,000 | 1.5 | 27.667 |
| 12,000 | 1,500 | 1.5 | 41.000 |
| 48,000 | 6,000 | 1.5 | 161.000 |
| 72,000 | 9,000 | 1.5 | 241.000 |
| 400 | 50 | 2 | 3.000 |
| 800 | 100 | 2 | 5.000 |
| 2,000 | 250 | 2 | 11.000 |
| 4,000 | 500 | 2 | 21.000 |
| 8,000 | 1,000 | 2 | 41.000 |
| 12,000 | 1,500 | 2 | 61.000 |
| 48,000 | 6,000 | 2 | 241.000 |
| 72,000 | 9,000 | 2 | 361.000 |

After the packets are switched, they undergo deceleration with an inverse buffering process. The packets are written into a buffer at an increased rate, and read out at a lower clock rate. In an example, the lower clock rate is the same as the original clock rate, and the packets are restored to their original duration and inter-packet gap.

Figure 6:
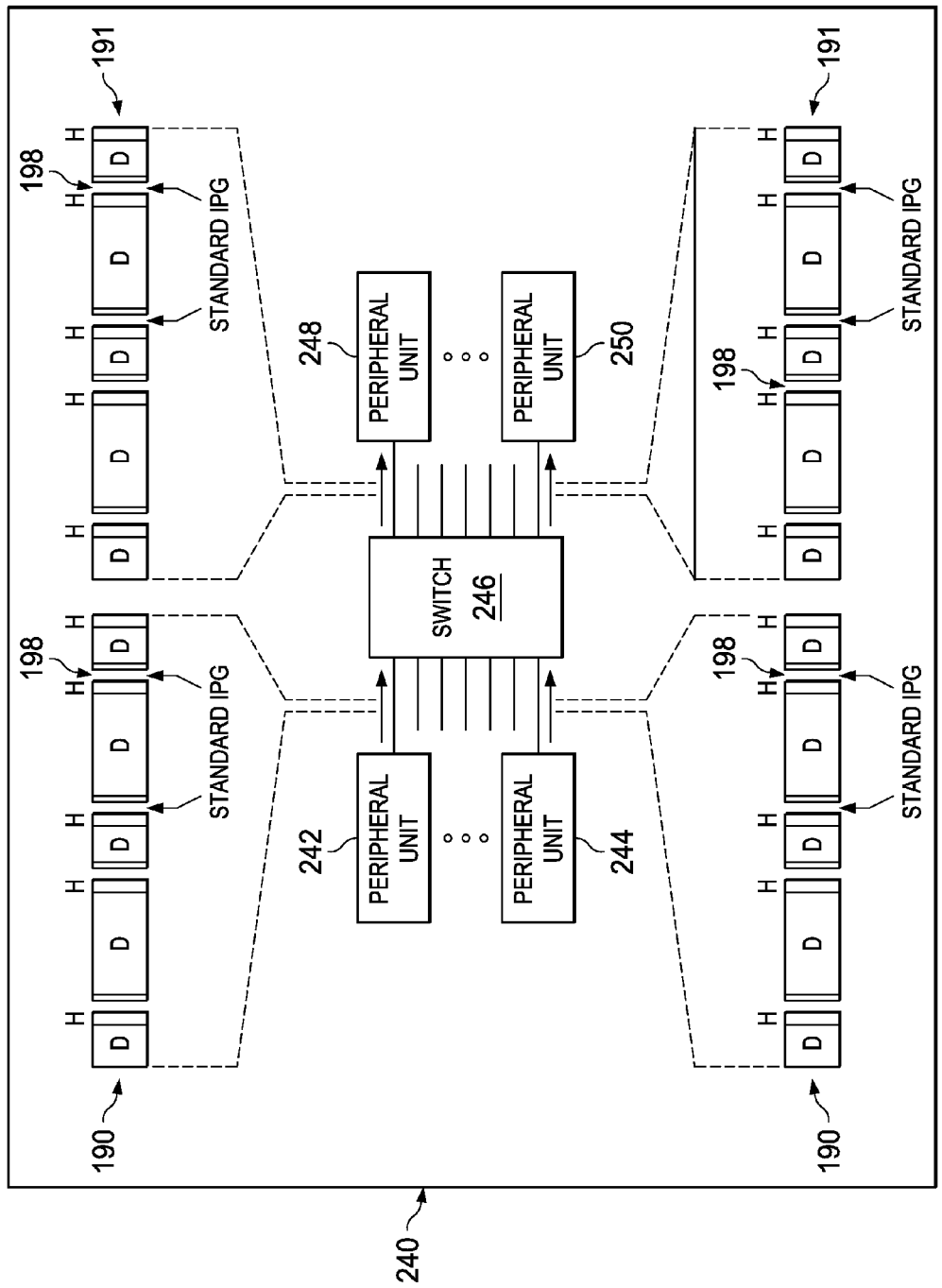
FIG. 6 illustrates an embodiment system for switching packets.

FIG. 6 illustrates a high level view of system 240 for switching packets. Peripheral units 242 and 244 produce packet streams, which are received by switch 246. Two peripheral units are pictured, but thousands or more of peripheral units may be used. Peripheral units 242 and 244 may be data center TOR switches, computer servers with built-in networking capability, or other devices, including the packet stream splitters of FIG. 1. Packet stream 190 with inter-packet gap 198 may be produced by peripheral units 242 and 244.

Switch 246 may be an electrical switch or a photonic switch. A variety of topologies may be used for the internal switch structure, internal control, and internal buffering, depending on the switch topology. Switch 246 makes all of its reconfigurations of its port-port and stage-stage connections within the time window of inter-packet gap 198.

Switch 246 feeds switched packet streams to peripheral units, such as peripheral unit 250 and peripheral unit 248. Two peripheral units are pictured, but many more peripheral units may be present. Packet stream 191 switched by switch 246 has inter-packet gap 198, the same inter-packet gap as packet stream 190 before switching. Also, packet stream 190 and packet stream 191 have the same bandwidth. Peripheral units 248 and 250 may be data center TOR switches, computer servers with built-in networking capability, or other devices.

Figure 7:
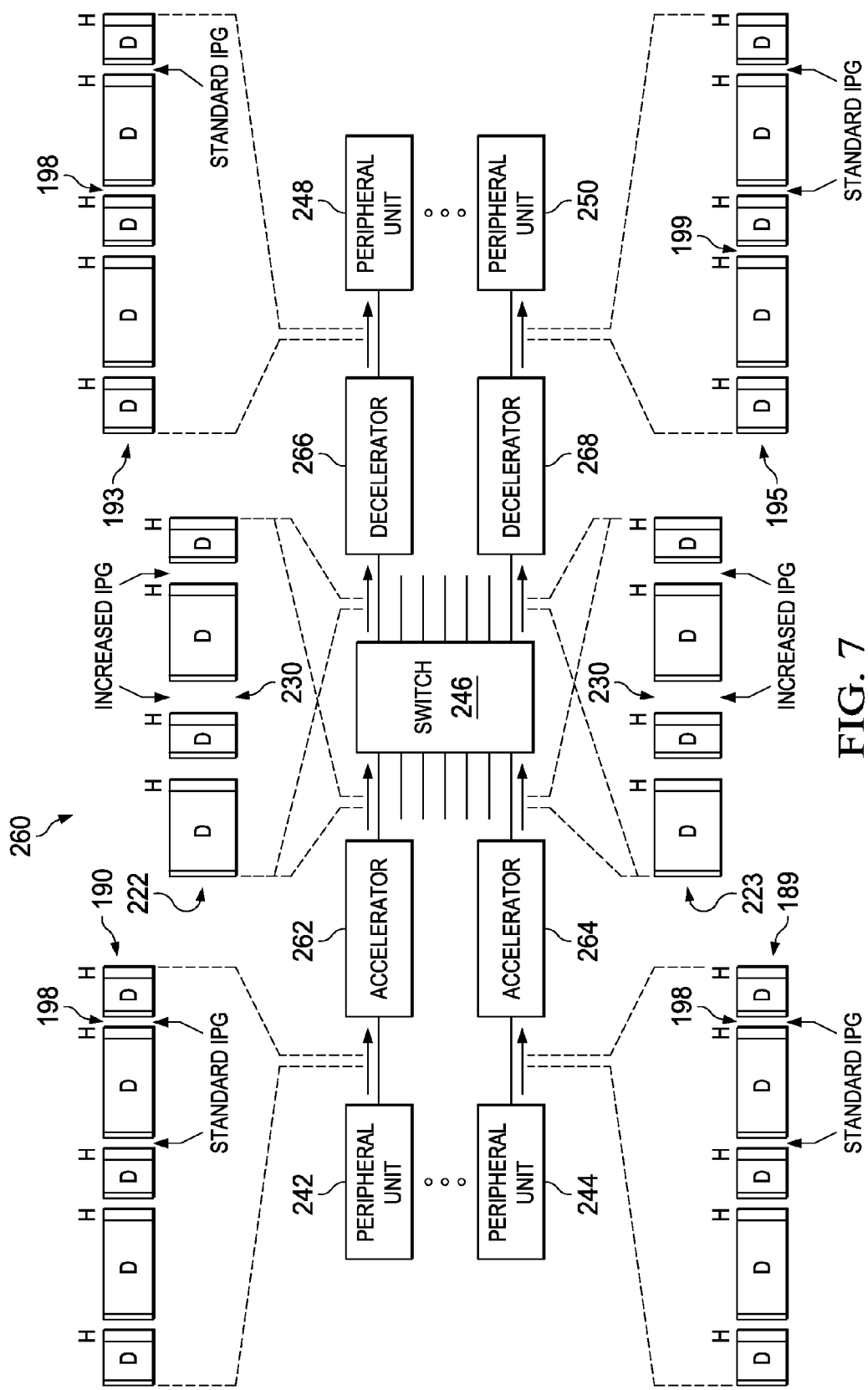
FIG. 7 illustrates an embodiment system for accelerating, switching and decelerating packets.

FIG. 7 illustrates system 260 for accelerating, switching, and decelerating packets. As in system 240, peripheral units, such as peripheral unit 242 and peripheral unit 244 produce packet streams 190 and 189, which each have inter-packet gap 198.

The packet streams are accelerated by accelerators. For example, packet stream 190 is accelerated by accelerator 262 and packet stream 189 is accelerated by accelerator 264. Accelerator 262 and accelerator 264 increase the clock rates of packet stream 190 to produce packet stream 222 with inter-packet gap 230 and of packet stream 189 to packet stream 223 with inter-packet gap 230, respectively. The packets are compressed in time, synchronized to the packet boundaries, so the start of the packets is spaced in time as when they entered the accelerator. By speeding up the packet clock, the packet duration is decreased, and the inter-packet gap is increased. Because the minimum inter-packet gap is much smaller than the packet length, the minimum inter-packet gap is increased substantially with a small decrease of the packet length and a small increase in the clock speed. The increase in the inter-packet gap is a function of the amount of clock speed increase and the length of the packet. For a given clock speed increase, the increase in the minimum inter-packet gap is proportional to the packet length. The increase in inter-packet gap is larger for longer packets, because longer packets have the same level of compression applied over a longer time duration. Accelerator 262 may be integrated into peripheral unit 242, and accelerator 264 may be incorporated into peripheral unit 244. In an example, the accelerators are integrated into TOR switches. Alternatively, the accelerators may be integrated into splitter 106, as pictured in system 100. In another example, the accelerators are stand-alone devices. Only two accelerators are pictured, but many more accelerators may be present. In an example, there is one accelerator for each packet stream.

The accelerated packets are fed to switch 246, which switches the accelerated packets. Switch 246 may be a photonic switch. The switch physical set up time of switch 246 is less than or equal to inter-packet gap 230. Switch 246 may contain an array of solid state photonic switches, which may be assembled into a fabric architecture, such as Baxter-Banyan, Benes, or CLOS.

By switching long packets, the photonic packet switching speed is relatively relaxed, because the packet duration is long, allowing relatively large inter-packet gaps to be created with moderate clock speed increases. In an example, long packets may have a variable length, and the photonic switch uses asynchronous switching. Alternatively, long packets may be transmitted as fixed length packets by padding them to a fixed length, for example 1500 bytes. This is only slightly less efficient than the asynchronous approach since nearly all the "long packets" are either at the fixed maximum length or are very close. Also, the synchronous switch structure that is enabled by using fixed length packets is easier to create, and does not require any photonic buffering, as long as the switch can be set up during the inter-packet gap.

After switch 246, the switched packets are transmitted to decelerators, such as decelerator 266 and decelerator 268. The decelerators synchronously decelerate the packet streams to have a reduced clock rate and inter-packet gap. For example, packet stream 222 with inter-packet gap 230 is decelerated to packet stream 193 with inter-packet gap 199, while packet stream 222 with inter-packet gap 230 is decelerated to packet stream 195 with inter-packet gap 199. In an example, inter-packet gap 199 is equal to inter-packet gap 198, which may be a standard inter-packet gap. Thus, the decelerated packets have the same inter-packet gap as the initial packets. Two decelerators are pictured, but many more decelerators may be present. In an example, there is a decelerator for each packet stream. Decelerator 266 may be integrated into peripheral unit 248, and decelerator 268 may be integrated into peripheral unit 250. In an example, the decelerators are integrated into TOR switches. Alternatively, the decelerators may be integrated into combiner 120, as pictured in system 100, or may be stand-alone devices.

Figure 8:
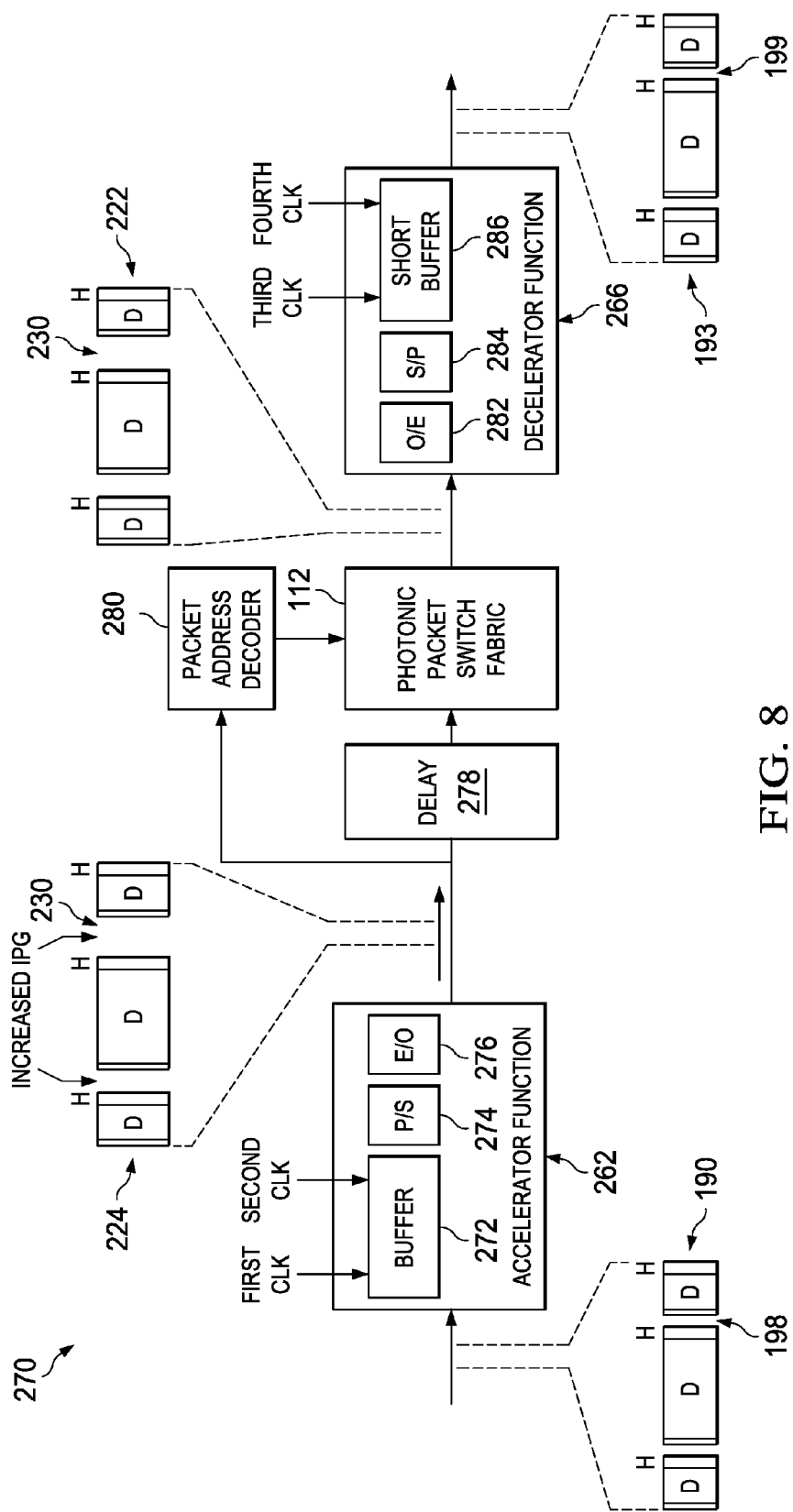
FIG. 8 illustrates another embodiment system for switching packets.

FIG. 8 illustrates system 270, which provides a more detailed view of packet acceleration, switching, and deceleration. Initially, accelerator 262 receives packet stream 190 with inter-packet gap 198 and accelerates it to packet stream 222 with inter-packet gap 230. Packet stream 190 is read into buffer 272 using a first clock at a first clock rate. Then, packet stream is read out of buffer 272 using a second clock at a second clock rate. The length of buffer 272 depends on the packet granularity. In one example, buffer 272 has a length greater than the largest packet, and packets are entirely read in at the first clock rate before being read out at the second clock rate. Alternatively, buffer 272 is shorter than the longest packet. In this example, a packet shorter than the buffer length is entirely read into buffer 272 before being read out. However, for a packet longer than the buffer, the leading portion of the packet may be read out at a higher clock rate while the trailing portion is being read in at the lower clock rate. Buffer 272 may be written with a continuous clock at the data rate of the input bit stream, or it may be written with an input gapped clock to prevent the original inter-packet gap keep a live signal from entering the buffer. The packets are then read out using a faster gapped clock.

Because the second clock rate is higher than the first clock rate, the input packet stream has a higher clock rate, and is therefore compressed in time. As a result of the faster clock speed, the output packet stream is compressed in time, and the inter-packet gap is increased. The start of the gaps may be synchronized to the packet trailing edge. Because the time period between the start of consecutive packets is fixed, the time compression of the packets or packet fragments increases the inter-packet gap.

After being read out from buffer 272, the packet stream goes to parallel to serial converter 274. Then, the packet is converted from the electrical domain to the optical domain by electric to optical converter 276.

After accelerator 262, the packet stream is split. A portion of the packet stream is sent to delay line 278 to be delayed, while the other portion is sent to packet address decoder 280. In an example, delay line 278 delays the packet by about 10 nanoseconds, to allow the packet address to be determined. Delay line 278 may be of any arbitrary length to handle the delay while the packet addresses are determined, but has no effect on the inter-packet gap between packet trailing edges and the leading edge of the next packet.

Packet address decoder 280 obtains the address of the packet, and feeds the address to photonic switching fabric 112. Packet address decoder 280 may decode the packet address by wavelength decoding, by reading the packet destination address, or by reading the address of a peripheral-peripheral wrapper placed around the packet. Additional packet address decoders are disclosed by the U.S. Provisional Patent Application Ser. No. 61/591,628 entitled "Spectral Encoding of an Optical Label or Destination" filed on Jan. 27, 2012, U.S. Patent Application No. 61/591,441 entitled "Optical Switching Device Using Spectral Trigger" filed on Jan. 27, 2012, and U.S. Provisional patent application Ser. No. 13/648,589 entitled "Spectral Encoding of an Optical Label or Destination," filed on Oct. 10, 2012, which are hereby incorporated herein by reference.

After delay line 278, the packet stream is fed to photonic switching fabric 112, where the packet is switched, producing packet stream 222 with inter-packet gap 230. The packet is switched by photonic switching fabric 112 by setting up the switch crosspoints based on the packet address from packet address decoder 280 before the new packet leading edge reaches the switch.

Switched packet stream 222 with inter-packet gap 230 is then decelerated by decelerator 266 to produce packet stream 193 with inter-packet gap 199. In an example, inter-packet gap 199 is the same as inter-packet gap 198. Decelerator 266 performs an inverse function of accelerator 262. Initially, packet stream 222 is converted from the optical domain to the electrical domain by optical to electrical converter 282. Then, the packet is converted from serial to parallel by serial to parallel converter 284.

After the conversion to parallel, the packet is fed to buffer 286 using a third clock at a third clock rate, and read out of buffer 286 using a fourth clock with a fourth clock rate, where the fourth clock rate is lower than the third clock rate. In an example, the second clock rate is equal to the third clock rate, the first clock rate is equal to the fourth clock rate, and packet stream 190 and packet stream 193 have the same clock rate and inter-packet gap.

Figure 9:
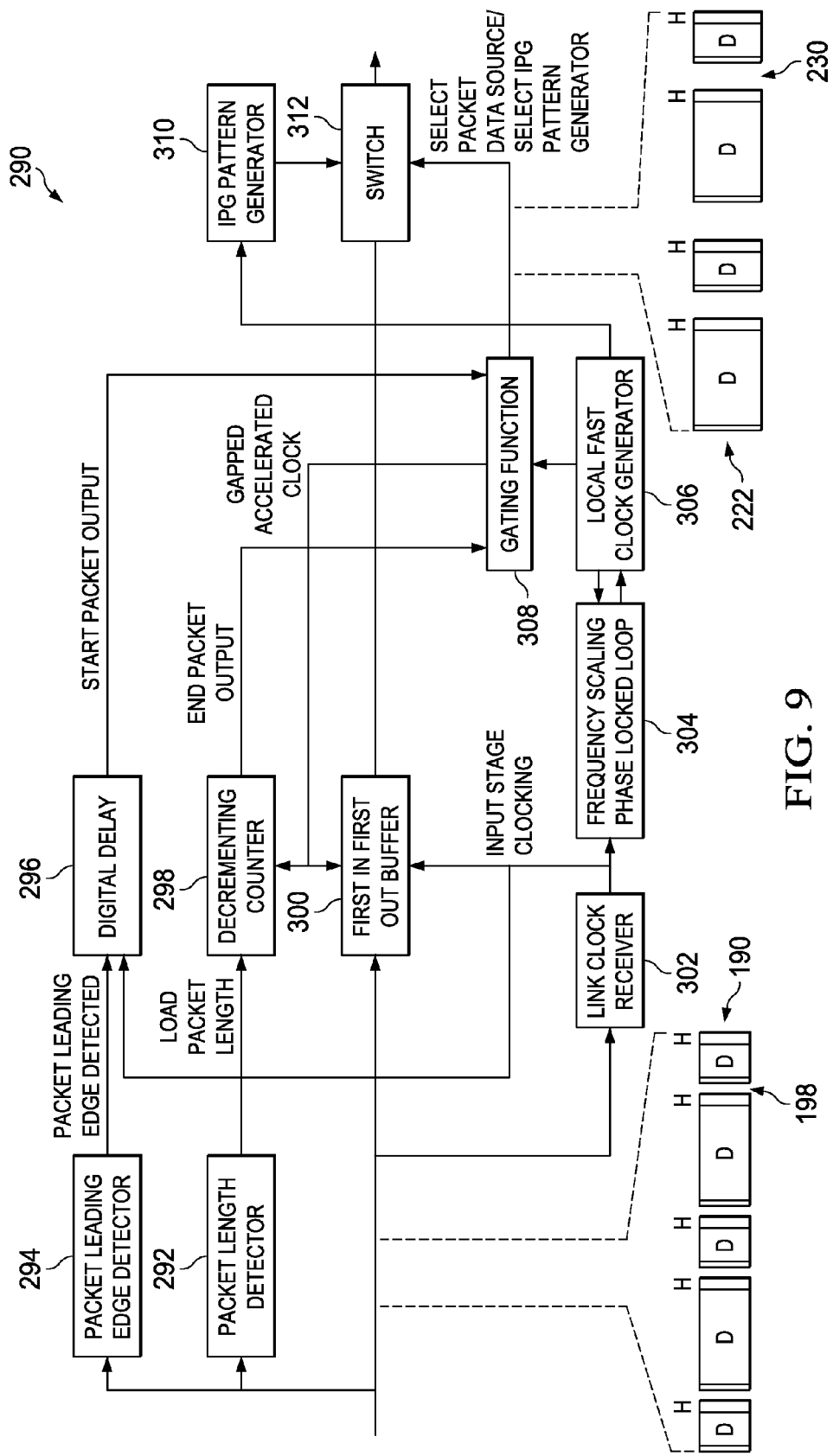
FIG. 9 illustrates an embodiment system for accelerating packets.

FIG. 9 illustrates accelerator 290, which may be used as accelerator 262. Accelerator 290 may be serial, nibble-wide (two or four bit wide) or byte wide. Packet stream 190 enters accelerator 290, where it feeds packet length detector 290, packet leading edge detector 294, clock receiver 302, and is read into buffer 300.

Packet length detector 292 determines the packet length. For example, packet length detector 292 measures the packet length or reads the packet length from a header field. Then, packet length detector 292 transmits the packet length to decrementing counter 298, which counts down from the packet length.

Packet leading edge detector 294 determines when a leading edge event has occurred. The packet leading edge indicates the start of the packet. The detection of the packet leading edge may take M clock cycles, where M is a function of the edge detection process. In an example, leading edge detection involves the detection of the termination of the inter-packet gap keep a live signal or pattern, which transitions to the packet preamble signal at the leading edge of the packet. In another example, direct detection is performed of the start of the packet preamble signal itself, which takes some time to confirm a valid preamble pattern. Packet leading edge detector 294 is triggered M cycles after the packet leading edge is detected. At that time, digital delay 296 produces a start packet output, which is fed to gating function 308.

Meanwhile, link clock receiver 302 recovers the incoming data clock rate and uses this to clock the incoming packet into buffer 300. The incoming data clock rate is also fed to phase locked loop (PLL) 304. In an example, PLL 304 is an A:B frequency scaling PLL that scales the frequency of the clock. PLL 304 is coupled to local fast clock generator 306, which generates a clock based on the scaled frequency. PLL 304 locks the local fast clock frequency to the incoming clock, so the local fast clock has an exact incoming clock. For example, the incoming clock is divided by A, and the local clock generator output by B. Then, to lock the resultant signals, the local clock is locked to B/A of the incoming clock. If B>A, then the generated clock is at a higher frequency than the received clock. For example, if B=11 and A=10, the local accelerated clock is 1.1 times the input clock rate. The generated clock is fed to gating function 308.

Based on input from gating function 308, switch 312 selects either the signal from inter-packet gap pattern generator 310, or from the packet stored in buffer 300. The packet is selected when there is data in the buffer, and the inter-packet gap pattern is selected during the inter-packet gap.

Gating function 308 inhibits the outgoing inter-packet gap pattern generator 310 by disconnecting it from the output port and instead connecting buffer 300 to the output port. Inter-packet gap pattern generator 310 produces a specific sequence of a given length which may or may not be synchronized to the end of the packet. Alternatively, inter-packet gap pattern generator 310 produces a simple pattern, or produces a stream of zeros, depending on the convention used for inter-packet gap format in a particular implementation. Gating function 308 enables the gapped accelerated clock line, feeding the accelerated clock produced by a local clock source to the output clocking point of buffer 300 and decrementing counter 298.

Buffer 300 is an N stage first in first out (FIFO) buffer, where N is greater than the longest packet length. The leading edge of the packet will arrive at a point N stages deep inside buffer 300 after N clock cycles. When buffer 300 is full, or close to full if it is a little larger than N. The packet is clocked out of buffer 300 at the accelerated clock rate, thereby compressing the packet in time while maintaining the packet leading edge N input clock cycles after the packet originally entered buffer 300. Once the packet is read out, decrementing counter 298 reaches zero, and sends an end of packet output signal to gating function 308. Then, gating function 308 disconnects the accelerated clock from the output of buffer 300 and from decrementing counter 298, and reconnects inter-packet gap pattern generator 310 to the output. Meanwhile, the next packet is being clocked into the buffer. Once they arrive at a point N stages in, the packet is also clocked out with an accelerated clock in the same manner. This requires additional counters, which are not shown in FIG. 9 for clarity. For a long packet switch with a packet length threshold of 750 bytes, only two pairs of counters are needed. However for a threshold of 500 bytes, three pairs of counters are needed.

Figure 10:
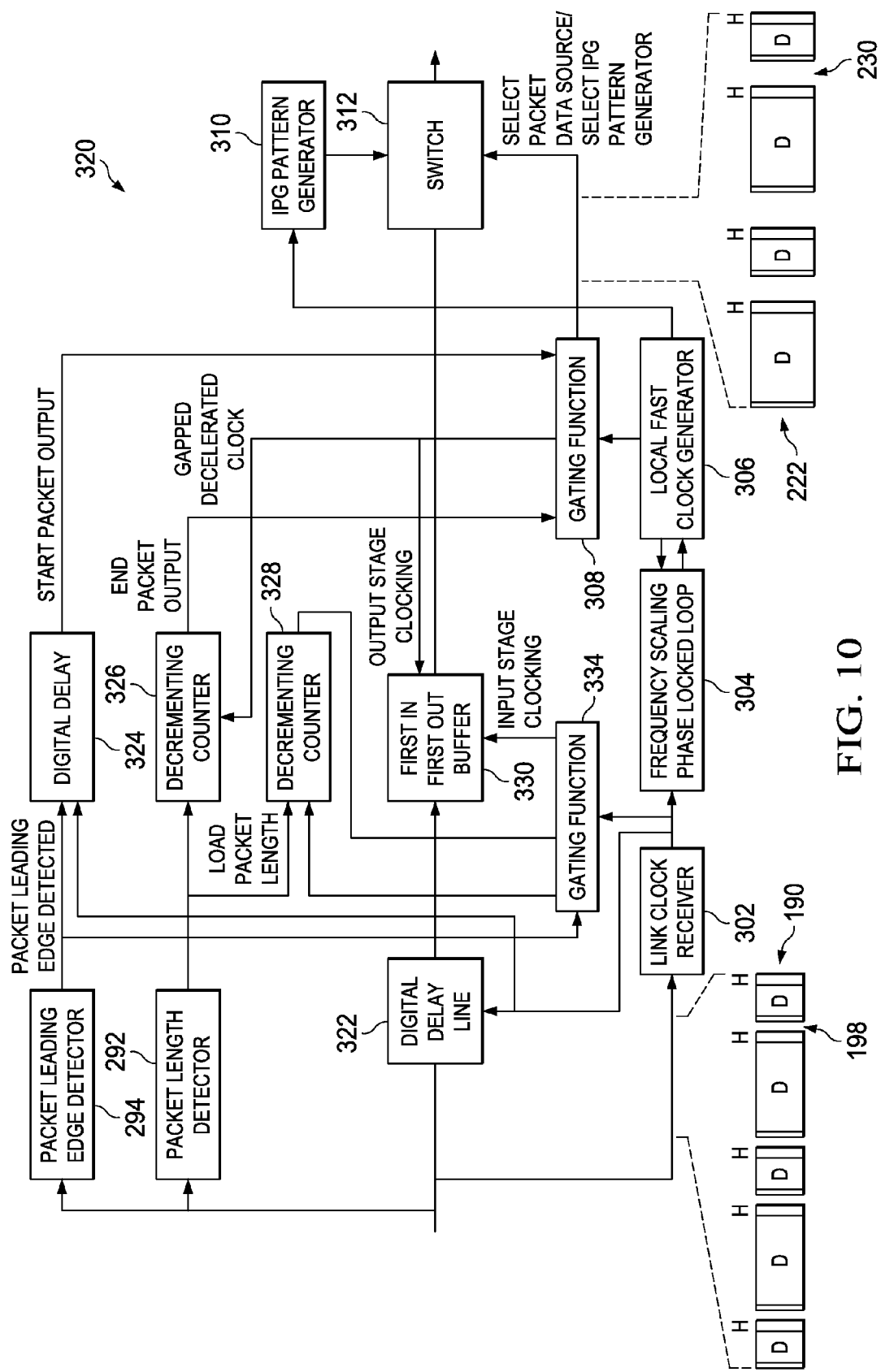
FIG. 10 illustrates another embodiment system for accelerating packets.

FIG. 10 illustrates another embodiment of an accelerator, accelerator 320, which may also be used as accelerator 262. Accelerator 320 includes input inter-packet gap rejection. Packet stream 190 with inter-packet gap 198 is received, for example from a TOR switch bus or from an optical receiver and a serial to parallel converter. Packet stream 190 is then fed to link clock receiver 302, packet length detector 292, packet leading edge detector 294, and digital delay line 322.

Packet length detector 292 measures or reads the packet length, and transmits the length to decrementing counter 326 and decrementing counter 328. Packet length detector 332 triggers decrementing counter 328, which controls gating function 334 to trigger buffer 330 to clock in the packet beginning at the packet leading edge, through the packet length.

Packet leading edge detector 294 may take some time after receiving the leading edge of the packet to detect the leading edge of the packet. After packet leading edge detector 294 detects the packet leading edge, it enables the output of gating function 334 to allow the packet to be clocked into buffer 330 from digital delay line 322. Packet leading edge detector 294 also outputs to gating function 334, after detecting the packet leading edge. Also, gating function 334 receives the input clock recovered by link clock receiver 302.

In an example, buffer 330 is an N stage FIFO independently clocked buffer, where its output is clocked independently of its input. N may be greater than the largest packet length. Link clock receiver 302 recovers the incoming data clock, and uses it to clock the incoming packet into buffer 330. As the packet is clocked into buffer 330, its leading edge arrives at a point N stages deep inside buffer 330 when buffer 330 is full or close to full. When decrementing counter 328 reaches zero, it halts the clocking of data into of buffer 330 by way of gating function 334. Thus, any inter-packet gap data pattern is not read into buffer 330. At this time, digital delay 324 is triggered by packet leading edge detector 294 M cycles after the packet leading edge is detecting, causing digital delay line 324 to output a start packet output message to gating function 308. Then, gating function 308 inhibits inter-packet gap pattern generator 310 by disconnecting it from the output port and connecting buffer 330 to the output port. The fast clock generated by local fast clock generator 306 is output to buffer 330 by gating function 308. The bytes of the packet are clocked out of buffer 330 at the new accelerated clock rate, thereby compressing the packet in time while maintaining the packet leading edge N+M input clock cycles after the packet originally entered buffer 330.

After the packet is read out, decrementing counter 326 reaches zero, and simultaneously sends an end packet output signal to gating function 308. Then, gating function 308 disconnects the accelerated clock from the output of buffer 330 and decrementing counter 326. Also, it reconnects inter-packet gap pattern generator 310 so the pattern generated by inter-packet gap pattern generator 310 is in the inter-packet gap. Switch 312, which is controlled by gating function 308, selects either the output from buffer 330 or inter-packet gap pattern generator 310 to be the output. The output packet stream 222 has an increased inter-packet gap 230.

The fast clock frequency generated by local fast clock generator 306 is frequency locked to the incoming clock received by link clock receiver 302 by phase locked loop 304, a frequency scaling phase lock loop. Thus, the local fast clock has an exact relationship with the incoming clock. For example, the incoming clock may be divided by A, and the local clock generator output is divided by B, and the resultant signals are locked, resulting in a local clock that is locked to B/A of the incoming clock. Meanwhile, the next packet is being clocked into the buffer. Once it arrives at a point N stages in, the packet is also clocked out with an accelerated clock in the same manner. This requires replication of some of the counters, which is not shown in FIG. 10 for clarity. For a long packet switch with a packet length threshold of 750 bytes only two sets of counters are needed. However, for a threshold of 500 bytes, three sets of counters are used.

Figure 11:
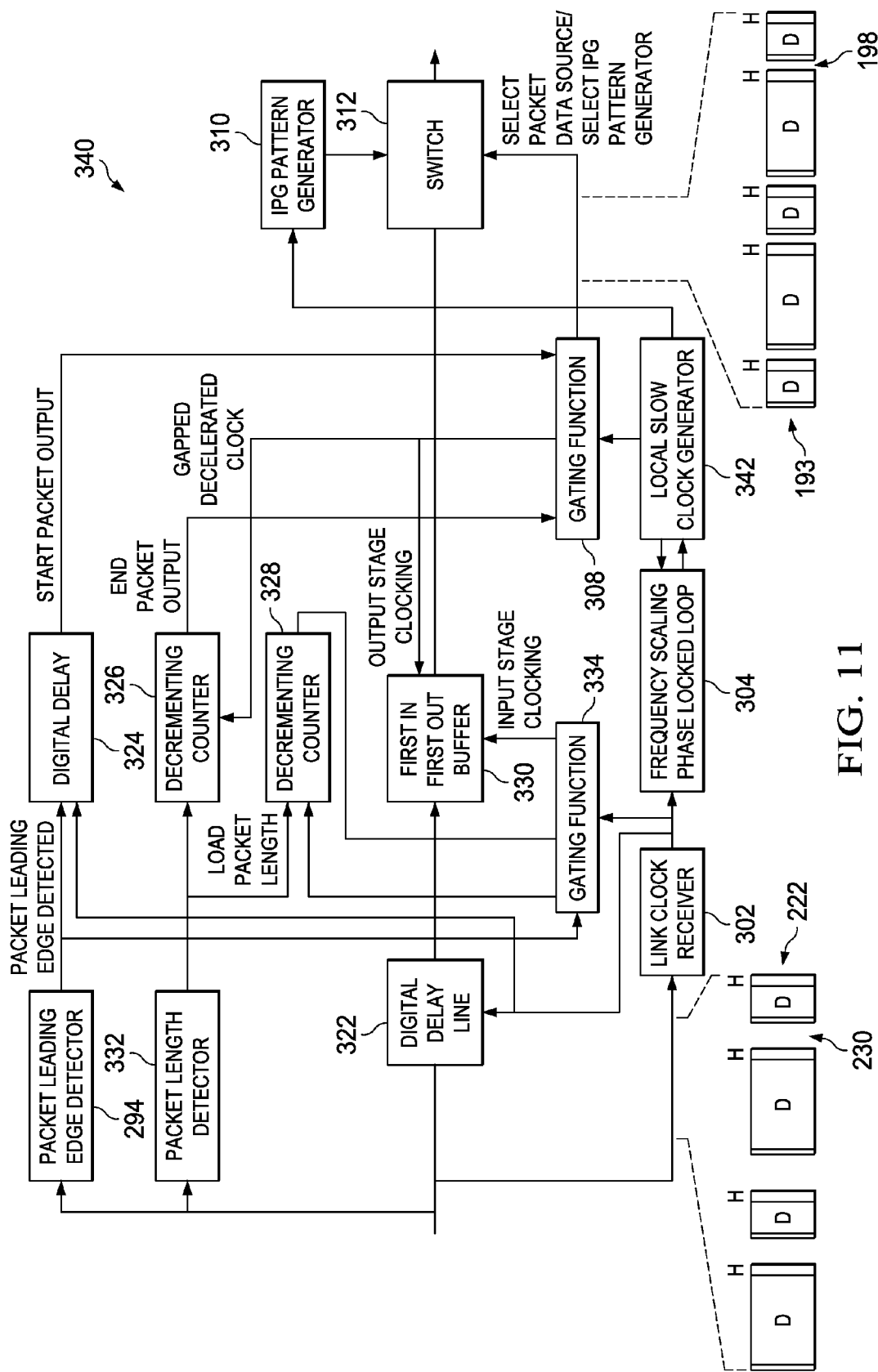
FIG. 11 illustrates an embodiment system for decelerating packets.

FIG. 11 illustrates decelerator 340, which may be used as decelerator 266. Decelerator 340 operates similarly to accelerator 320, and has a similar structure but applies an inverse function to recreate the original bit rates and inter-packet gap. Decelerator 340 rejects the input inter-packet gap. The length, and hence the number of bytes, in the expanded inter-packet gap exceed that of the original inter-packet gap, and would cause saturation of buffer 330 if allowed to flow unimpeded. Decelerator 340 may accept serial, nibble-wide, and byte-wide packets. Packet stream 222, with an expanded inter-packet gap 230, enters decelerator 340, and is split and fed to digital delay line 322, packet length detector 332, packet leading edge detector 294, and link clock receiver 302.

Packet length detector 332 determines the length of the input packet. For example, packet length detection 332 measures or reads from a header field the packet length. Then, packet length detector sends the packet length to decrementing counter 326 and decrementing counter 328.

Packet leading edge detector 294 may take some time to detect a packet leading edge from when it is read in. For example, detection of the packet leading edge may take M clock cycles, where M is a function of the edge detection process. Once packet leading edge detector 294 detects a packet leading edge, it signals gating function 334 to permit buffer 330 to read in the packet from digital delay line 322.

In an example, buffer 330 is an N stage FIFO buffer, where N is greater than the length of the largest packet. Also, buffer 330 is independently clocked, where its output may be clocked independently of its input. Link clock receiver 302 recovers the incoming data clock rate, and uses this to clock the input the packet to buffer 330. The leading edge of the packet will arrive at a point N stages deep inside buffer 330 after N clock cycles. When decrementing counter 326 and decrementing counter 328 reach zero, decrementing counter 328 triggers gating function 334 to signal buffer 330 to stop reading in packets, thereby rejecting any enlarged inter-packet gap data pattern. The inter-packet gap data pattern will be replaced by an inter-packet gap data pattern conforming to the original sizing to fill the restored original inter-packet gap.

Digital delay 324, triggered by packet leading edge detector 294 M cycles after detecting the packet leading edge, produces start packet output. Start packet output is fed to gating function 308. In response, gating function 308 inhibits inter-packet gap pattern generator 310 by signaling switch 312 to disconnect its output. Also, switch 312 connects the output of buffer 330 to the output port. Gating function 308 also enables the gapped decelerated clock produced by local slow clock generator 342 to be fed to the output clocking port of buffer 330. When the slow clock has a frequency of A/B of the accelerated clock, and the accelerated clock has a relationship of B/A times the original clock rate, the decelerated clock has the same frequency as the original clock. Buffer 330 clocks out the bytes of the packet at the decelerated clock rate, thereby decompressing the packet while maintaining the packet leading edge at N+M input clock cycles after the packet originally entered buffer 330. Once the packet is read out of buffer 330, decrementing counter 326 will reach zero and send an end packet output signal to gating function 308. Then, gating function 308 will disconnect the decelerated clock from the clock output of buffer 330 and from decrementing counter 326. Also, gating function 308 will cause switch 312 to disconnect the output of buffer 330 and to connect the output of inter-packet gap pattern generator 310 from the output port. The inter-packet gap pattern will thus be inserted into the inter-packet gap.

The local slow clock, generated by local slow clock generator 342, is frequency locked to the incoming clock received by link clock receiver 302 of PLL 304. Therefore, the local slower clock has an exact relationship with the incoming clock, for example scaled A/B, where the local clock is scaled to A/B of the incoming clock. For example, the incoming clock is divided by B, and the local clock is divided by A. The resultant signals are locked. If B>A the generated clock is at a lower frequency than the received clock. For example if B=11 and A=10, the local decelerated clock is at 1/1.1 times (=0.9090909 times) the input clock rate.

The increase in inter-packet gap is proportional to the increase in clock speed and the length of the packets. Because the increase in inter-packet gap is greater for long packets, this technique may be especially useful in system 100, where only long packets are routed to the photonic switch. A large inter-packet gap, which makes the packets easier to switch by a slow photonic switch, requires a significant amount of compression, and therefore a large increase in bit rate clock. The packets may have random length packets, random length packets within a given range, for example with no short packets, or fixed length packets.

Figure 12:
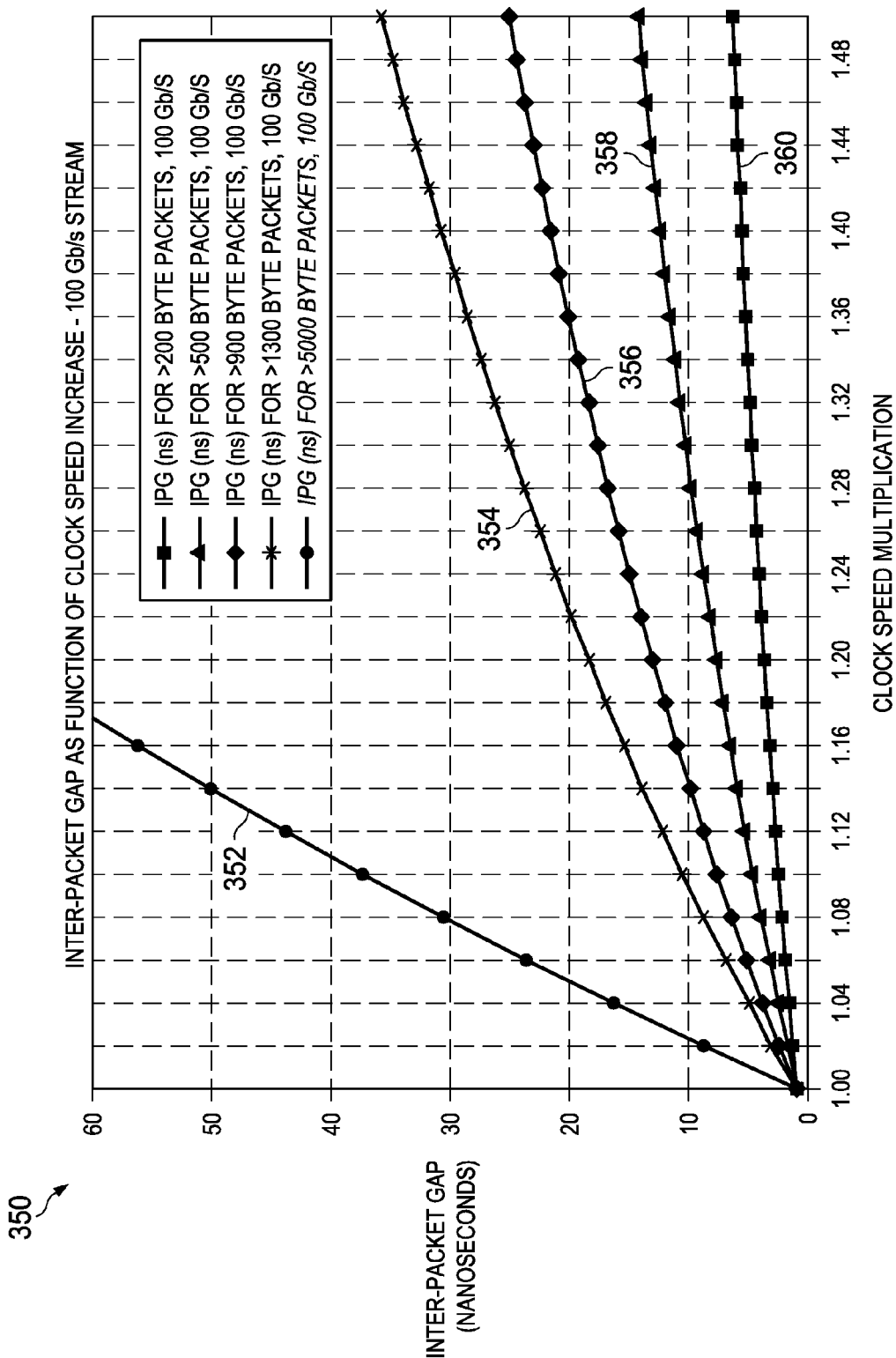
FIG. 12 illustrates a graph of clock speed multiplication versus inter-packet gap.

FIG. 12 illustrates graph 350, showing clock speed multiplication versus inter-packet gap in nanoseconds for a 100 Gb/s packet stream. Curve 352 depicts the shortest inter-packet gap for packets longer than 5000 bytes, curve 354 depicts the inter-packet gap for packets longer than 1300 bytes, curve 356 depicts the inter-packet gap for packets longer than 900 bytes, curve 358 illustrates the inter-packet gap for packets with longer than 500 bytes, and curve 360 illustrates the inter-packet gap for packets with a size longer than 200 bytes. An increase in inter-packet gap from 1 ns to 20 ns requires a clock speed acceleration of 22% for 1300 byte or longer packets and an increase of 36% for 900 byte or longer packets. Also, an increase in inter-packet gap from 1 ns to 10 ns requires a 9% acceleration for 1300 byte or longer packets, a 14% acceleration for 900 byte or longer packets, and a 29% acceleration for 500 byte packets. In an example, acceleration is performed for packets larger than a set value, ranging from 500 bytes to 1400 bytes.

Figure 13:
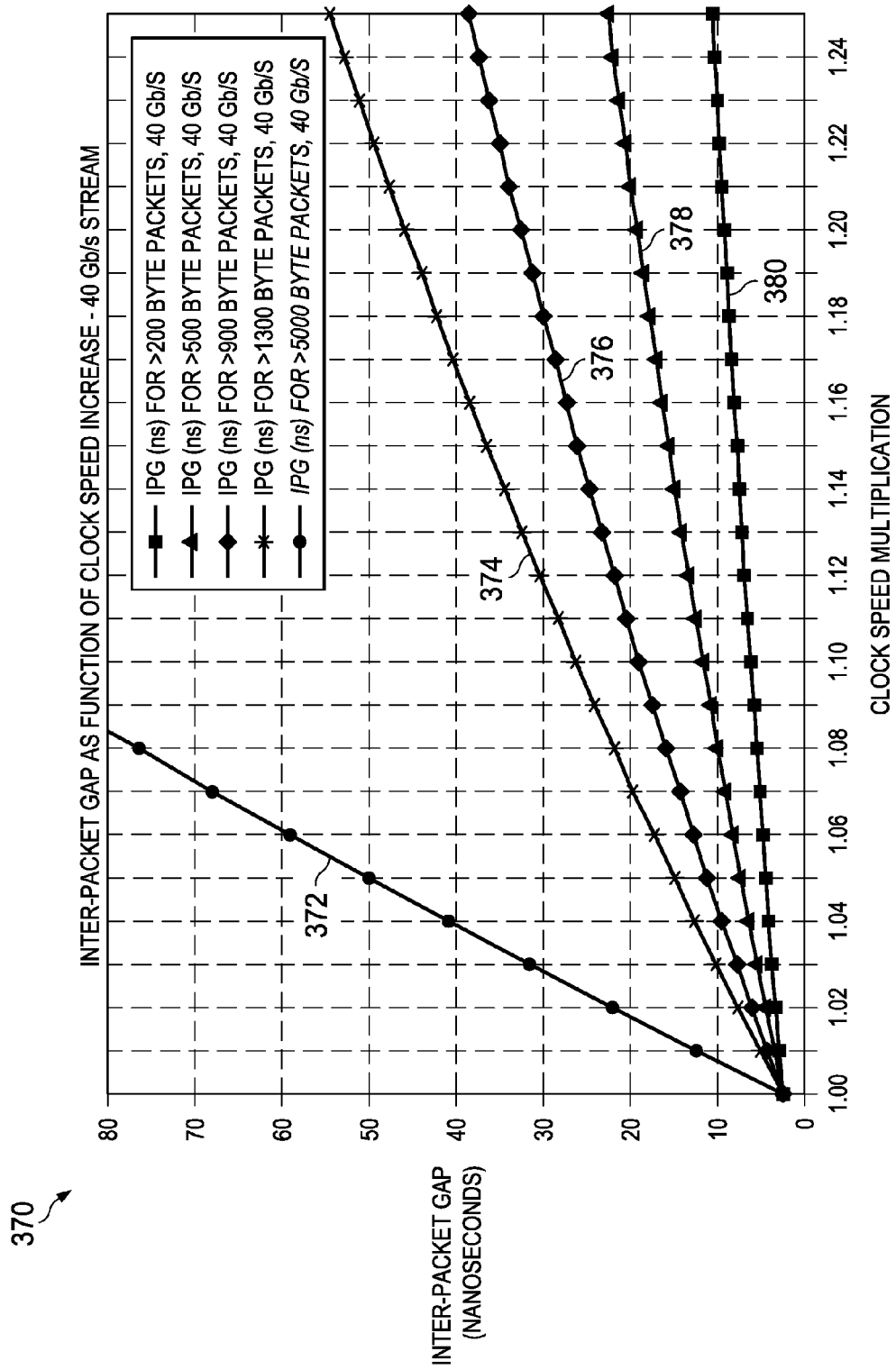
FIG. 13 illustrates another graph of clock speed multiplication versus inter-packet gap.

FIG. 13 illustrates graph 370 of clock speed multiplication versus inter-packet gap for a 40 Gb/s packet stream. Curve 372 illustrates the shortest inter-packet gap for packets longer than 5000 bytes, curve 374 illustrates the shortest inter-packet gap for packets longer than 1300 bytes, curve 376 illustrates the shortest inter-packet gap for packets longer than 900 bytes, curve 378 illustrates the shortest inter-packet gap for packets longer than 500 bytes, and curve 380 illustrates the shortest inter-packet gap for packets longer than 200 bytes. An increase in inter-packet gap from 2.5 ns to 20 ns may be accomplished by a 7.2% acceleration for 1300 byte or longer packets, an 11% acceleration for 900 byte or longer packets, and a 21.5% acceleration for 500 byte or longer packets. Additionally, an increase in inter-packet gap from 2.5 ns to 10 ns is accomplished by a 3% acceleration for 1300 byte or longer packets, a 4% acceleration for 900 byte or longer packets, an 8% acceleration for 500 byte or longer packets, and a 22% acceleration for 200 byte or longer packets.

Figure 14:
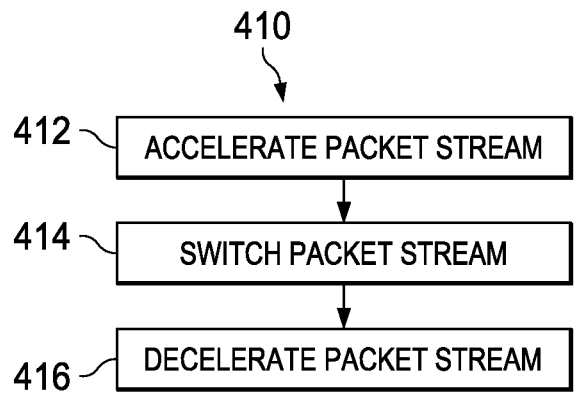
FIG. 14 illustrates an embodiment method of steering packets.

FIG. 14 illustrates flowchart 410 showing a method of switching packets. Initially, in step 412, packets are accelerated. The packet data is compressed in time by reading the packet into a buffer at an input clock rate, and reading the data out of the buffer at a higher output clock rate. As the packet data is compressed, and the packet edges remain synchronous, the inter-packet gap is increased. The inter-packet gap increase is greater for long packets, because the length of the long packets is reduced more for a given increase in clock rate. Also, the inter-packet gap is increase is greater for a larger increase in clock rate. The bandwidth of the packet is also increased.

Next, the accelerated packet is switched in step 414. The switching may be performed by a photonic packet switching fabric. Alternatively, the switching may be performed by an electronic switching fabric. When the switching is performed by a photonic switching fabric, the increase in the inter-packet gap gives the photonic switching fabric additional time to set up its crosspoint between packets. The photonic switching fabric can handle the increase in the bandwidth of the packet, because it can support a large bandwidth through established connections.

After switching, the switched packet stream is decelerated in step 416. Deceleration performs an inverse function of acceleration, in a similar manner. The packet is read into a buffer at an input clock rate, and read out at the buffer at a lower output clock rate. In an example where the lower output clock rate is equal to the original input clock rate, the final packet has the same clock rate, bandwidth, and inter-packet gap as the input packet.

Figure 15:
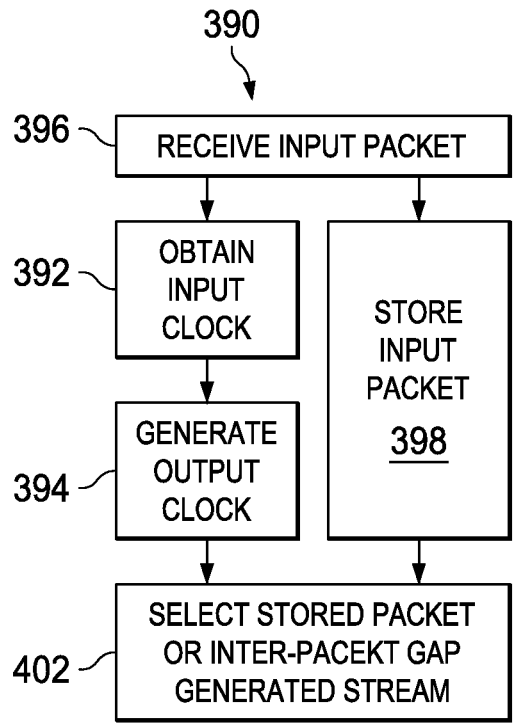
FIG. 15 illustrates an embodiment method of accelerating and decelerating packets.

FIG. 15 illustrates flowchart 390 for accelerating or decelerating a packet stream. Initially, an input packet is received in step 396. Then, the input clock is obtained, for example from the input packet, in step 392.

In step 394, the output clock is generated. In acceleration, the output clock has a higher clock rate than the input clock, while in deceleration, the output clock has a lower clock rate than the input clock. The output clock is frequency phase locked with the input clock to maintain a direct relationship. For example, the input clock is multiplied by A, the output clock is multiplied by B, and the resulting clocks are phase locked.

Finally, in step 402, either the stored packet or an inter-packet gap generated stream is selected. The stored packet is selected when there is a packet in the buffer, and the inter-packet gap generated stream is selected in the inter-packet gap of the packet stream.

Also, the input packet is stored into a buffer using the initial clock rate in step 398. Then, the stored packet is read out of the buffer at the output clock rate in step 400. In an example, the spacing of the leading packet edge is the same for the input packet and the output packet. When the output clock rate is higher than the input clock rate, the output packet is accelerated, and the packet is compressed in time, having an increased bandwidth, while the inter-packet gap is increased.

In an embodiment, the required photonic crosspoint switching speed requirement is reduced by more than an order of magnitude, as the inter-packet gap of a packet stream to be switched by the photonic switch is increased. In another embodiment, the timing constraints and tolerances on synchronization design are increased by more than an order of magnitude.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for accelerating a packet stream, the system comprising:
    a first accelerator configured to re-clock a plurality of input packets of the packet stream from a first clock rate to a second clock rate to produce a plurality of accelerated packets of an accelerated packet stream, wherein the first clock rate is less than the second clock rate, wherein a first plurality of leading edges of the plurality of input packets is synchronous with a second plurality of leading edges of the plurality of accelerated packets, wherein the packet stream has a first inter-packet gap, wherein the accelerated packet stream has a second inter-packet gap, and wherein the second inter-packet gap is greater than the first inter-packet gap; and
    a switch coupled to the first accelerator, wherein the switch is configured to switch the accelerated packet stream at the second clock rate to produce a switched packet stream.

2. The system of claim 1, further comprising a synchronizer coupled to the first accelerator, wherein the synchronizer is configured to detect the first plurality of leading edges of the plurality of input packets.

3. The system of claim 1, further comprising a first decelerator coupled to the switch, wherein the first decelerator is configured to re-clock the switched packet stream from the second clock rate to a third clock rate to produce a decelerated packet stream, wherein the second clock rate is greater than the third clock rate, wherein the decelerated packet stream has a third inter-packet gap, and wherein the third inter-packet gap is smaller than the second inter-packet gap.

4. The system of claim 3, wherein the first clock rate equals the third clock rate.

5. The system of claim 3, further comprising:
an electrical-to-optical converter coupled between the first accelerator and the switch; and
an optical-to-electrical converter coupled between the switch and the first decelerator, wherein the switch is a photonic switch.

6. The system of claim 3, further comprising:
a first peripheral coupled to the first accelerator; and
a second peripheral coupled to the first decelerator.

7. The system of claim 3, further comprising:
a plurality of accelerators coupled to the switch; and
a plurality of decelerators coupled to the switch.

8. The system of claim 3, further comprising:
a packet splitter coupled to the first accelerator;
a packet combiner coupled to the first decelerator; and
an electrical switch coupled between the packet splitter and the packet combiner, wherein the switch is a photonic switch, and wherein the packet splitter is configured to route a first plurality packets of the packet stream having a first plurality of lengths greater than a first threshold to the photonic switch and a second plurality of packets of the packet stream having a second plurality of lengths less than or equal to the first threshold to the electrical switch.

9. The system of claim 1, further comprising:
a delay unit coupled between the first accelerator and the switch; and
a packet address decoder coupled between the first accelerator and the switch.

10. The system of claim 1, wherein the first accelerator comprises:
a clock receiver configured to receive a first clock signal having the first clock rate;
a clock generator configured to generate a second clock signal having the second clock rate;
a gating module coupled to the clock generator; and
a buffer coupled to the clock receiver, the clock generator, and the gating module, wherein the buffer is configured to store a first packet of the packet stream at the first clock rate and retrieve the stored packet at the second clock rate.

11. The system of claim 10, wherein the first accelerator further comprises:
a splitter configured to replicate the packet stream into a first packet stream, a second packet stream, and a third packet stream;
a packet leading edge detector configured to receive the third packet stream;
a packet length detector configured to receive the second packet stream; and
a digital delay coupled between the packet leading edge detector and the gating module, wherein the digital delay is configured to signal to the gating module to start reading out the stored packet in accordance with a leading edge of the stored packet detected by the packet leading edge detector.

12. The system of claim 1, wherein the switch is a photonic switch.

13. A system for decelerating a packet stream, the system comprising:
a switch configured to switch the packet stream at a first clock rate; and
a decelerator coupled to the switch, wherein the decelerator is configured to re-clock a plurality of switched packets of the switched packet stream from the first clock rate to a second clock rate to produce a plurality of decelerated packets of a decelerated packet stream, wherein the second clock rate is lower than the first clock rate, wherein a first plurality of leading edges of the plurality of switched packets is synchronous with a second plurality of leading edges of the plurality of decelerated packets, wherein the switched packet stream has a first inter-packet gap, wherein the decelerated packet stream has a second inter-packet gap, and wherein the second inter-packet gap is smaller than the first inter-packet gap.

14. The system of claim 13, wherein the switch is a photonic switch.

15. The system of claim 13, wherein the decelerator comprises:
a clock receiver configured to receive a first clock signal having the first clock rate;
a clock generator configured to generate a second clock signal having the second clock rate;
a gating module coupled to the clock generator; and
a buffer coupled to the clock receiver, the clock generator, and the gating module, wherein the buffer is configured to store the switched packet stream at the first clock rate and retrieve the stored packet at the second clock rate.

16. The system of claim 15, wherein the decelerator further comprises:
a splitter configured to split the switched packet stream into a first packet stream, a second packet stream, and a third packet stream;
a packet leading edge detector configured to receive the third packet stream;
a packet length detector configured to receive the second packet stream; and
a digital delay coupled between the packet leading edge detector and the gating module, wherein the digital delay is configured to signal to the gating module to start reading out the stored packet in accordance with a leading edge of the stored packet detected by the packet leading edge detector.

17. A method for accelerating a packet stream, the method comprising:
receiving a plurality of input packets of the packet stream at a first clock rate, wherein the packet stream has a first inter-packet gap and a first plurality of leading edges;
storing the plurality of packets in a first buffer at the first clock rate;
generating a second clock having a second clock rate, wherein the second clock rate is higher than the first clock rate;
retrieving the stored plurality of packets at the second clock rate to produce a plurality of accelerated packets of an accelerated packet stream, wherein a second plurality of leading edges of the plurality of accelerated packets are synchronous with the first plurality of leading edges of the plurality of input packets, wherein the accelerated packet stream has a second inter-packet gap, and wherein the second inter-packet gap is greater than the first inter-packet gap; and
optically switching the accelerated packet stream.

18. The method of claim 17, further comprising:
storing the accelerated packet stream in a second buffer at the second clock rate;
generating a third clock having a third clock rate, wherein the third clock rate is lower than the second clock rate; and
retrieving the stored accelerated packet stream at the third clock rate to produce a decelerated packet stream, wherein the decelerated packet stream has a third inter-packet gap, and wherein the third inter-packet gap is smaller than the second inter-packet gap.

19. The method of claim 18 wherein the third inter-packet gap is equal to the first inter-packet gap.

20. The method of claim 17, further comprising:
detecting a leading edge of a first packet of the packet stream; and
detecting a length of the first packet.

21. A method for decelerating a packet stream, the method comprising:
optically switching the packet stream;
storing a plurality of input packets of the packet stream in a first buffer at a first clock rate, wherein the packet stream has a first inter-packet gap, and wherein the plurality of input packets has a first plurality of packet leading edges;
generating a second clock having a second clock rate, wherein the second clock rate is lower than the first clock rate; and
retrieving the stored packet stream at the second clock rate to produce a plurality of decelerated packets of a decelerated packet stream, wherein the plurality of decelerated packets has a second plurality of packet leading edges, wherein the second plurality of leading edges is synchronous with the first plurality of packet leading edges wherein the decelerated packet stream has a second inter-packet gap, and wherein the second inter-packet gap is less than the first inter-packet gap.

* * * * *